Figure 9:
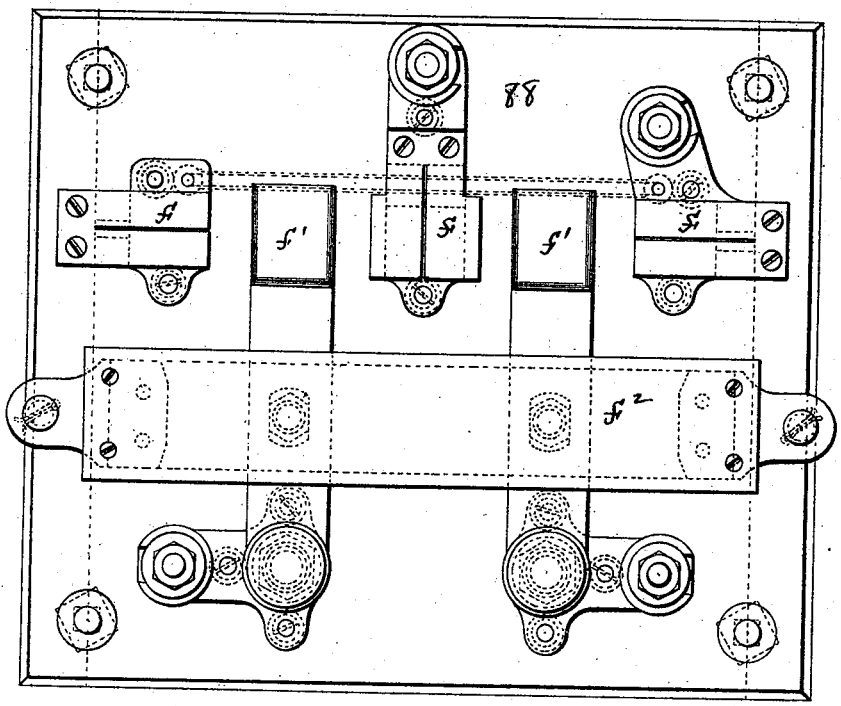

(No Model.) 8 Sheets—Sheet 1.
W. H. MORGAN.
ELECTRICALLY OPERATED OVERHEAD TRAVELING CRANE.
No. 496,427. Patented May 2, 1893.
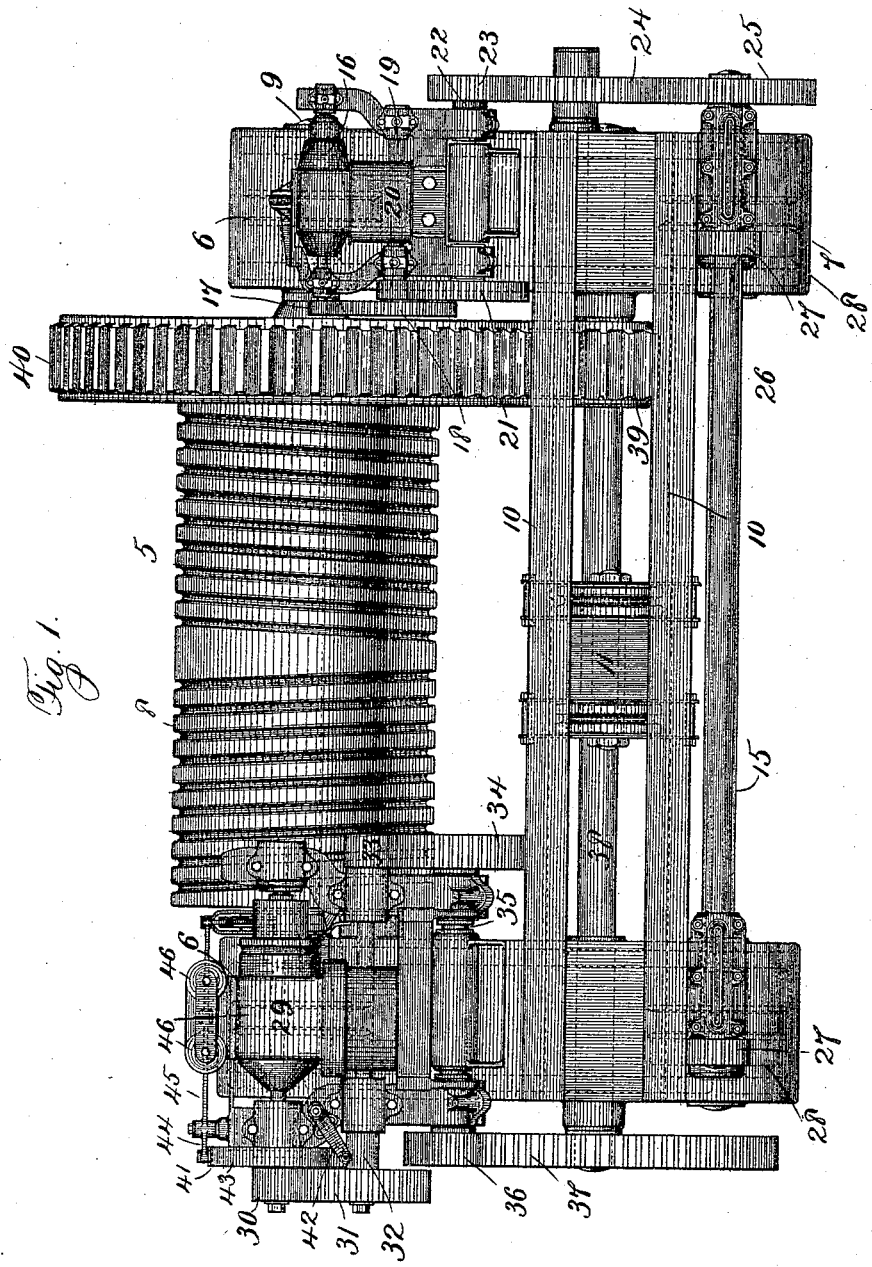
Witnesses
W. D. Thomas.
C. L. Taylor
Inventor
William H. Morgan
By H. A. Seymour.
His attorney (No Model.) 8 Sheets—Sheet 2.
W. H. MORGAN.
ELECTRICALLY OPERATED OVERHEAD TRAVELING CRANE.
No. 496,427. Patented May 2, 1893.
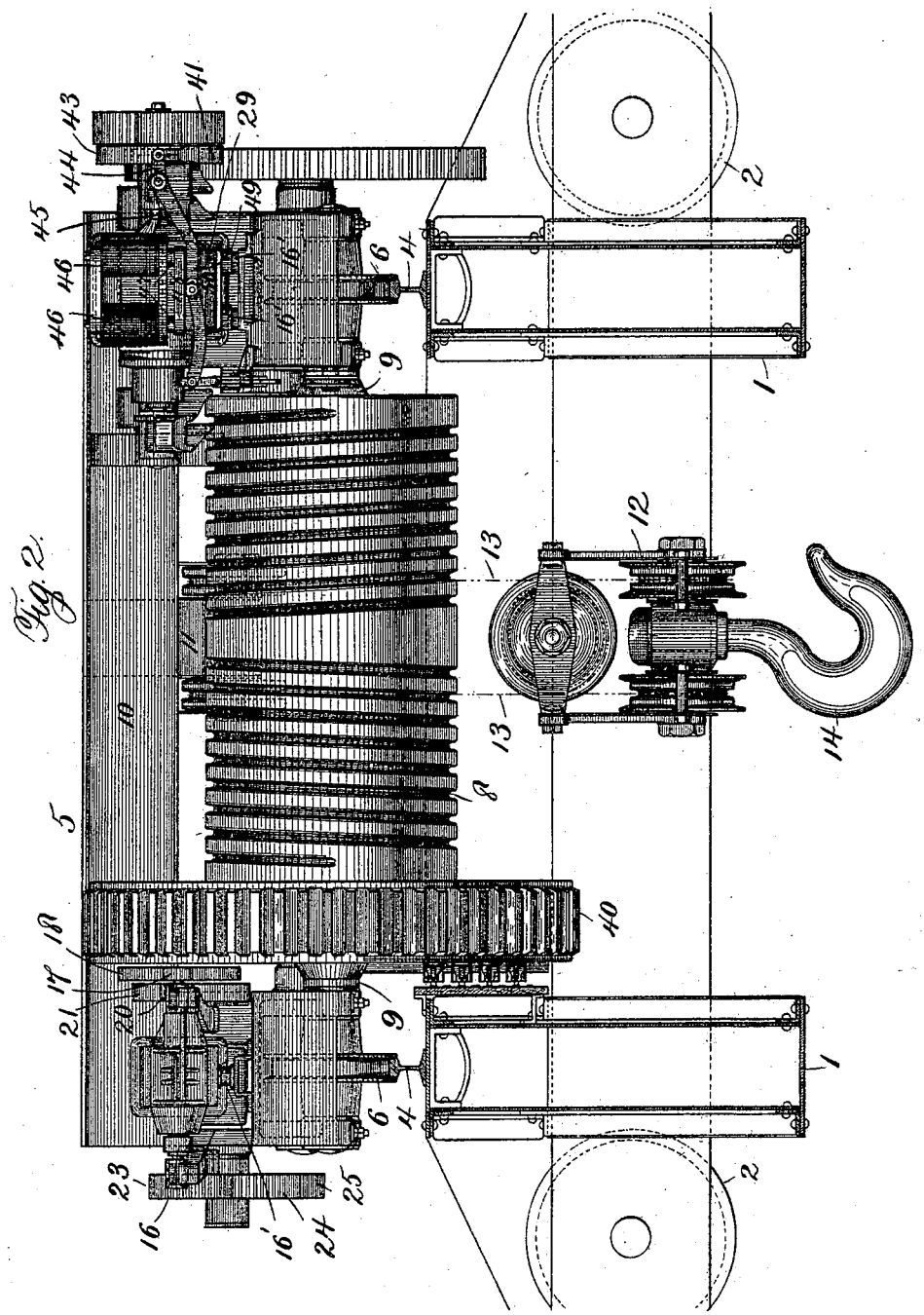

(No Model.)  8 Sheets—Sheet 3.
W. H. MORGAN.
ELECTRICALLY OPERATED OVERHEAD TRAVELING CRANE.
No. 496,427. Patented May 2, 1893.
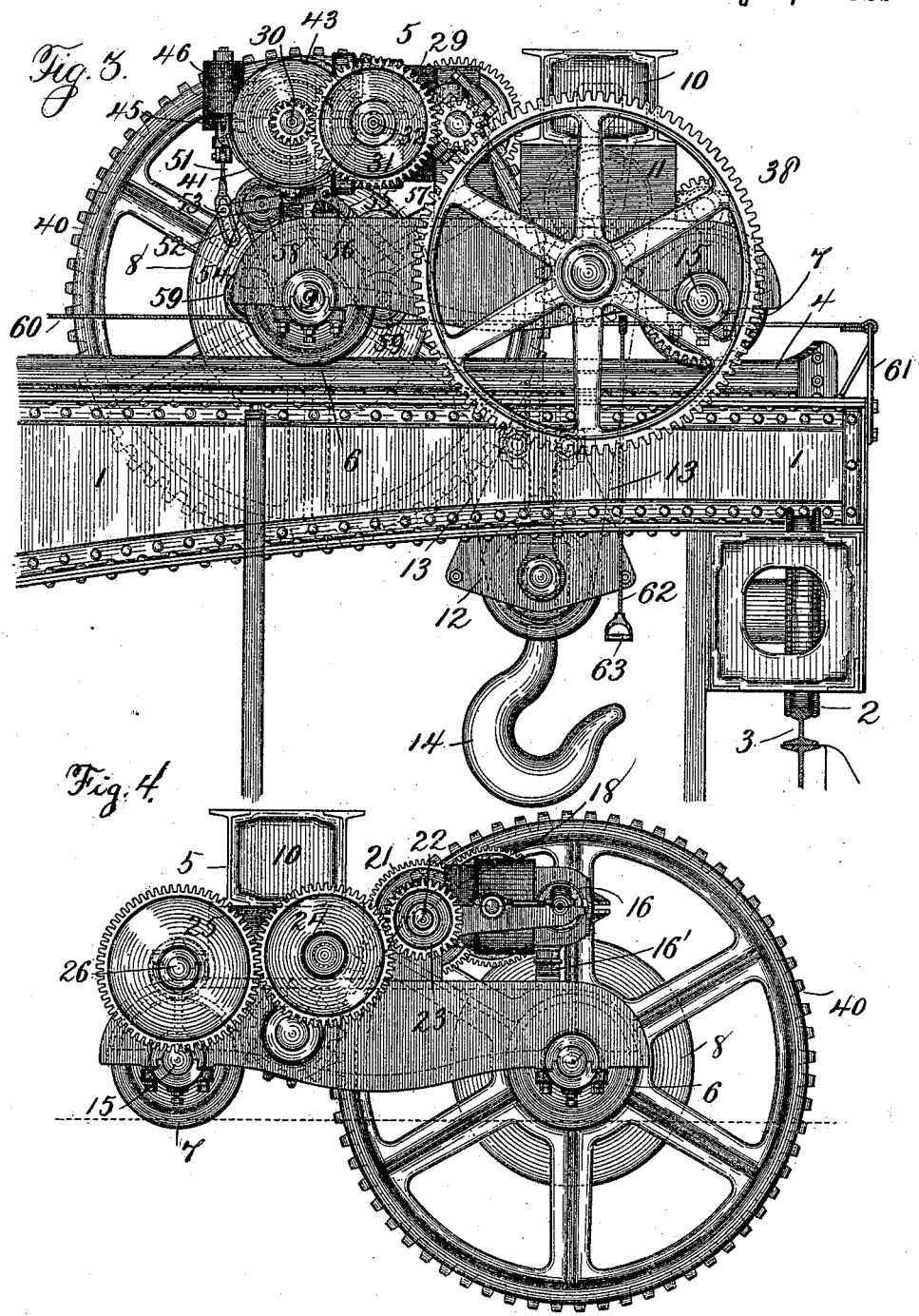

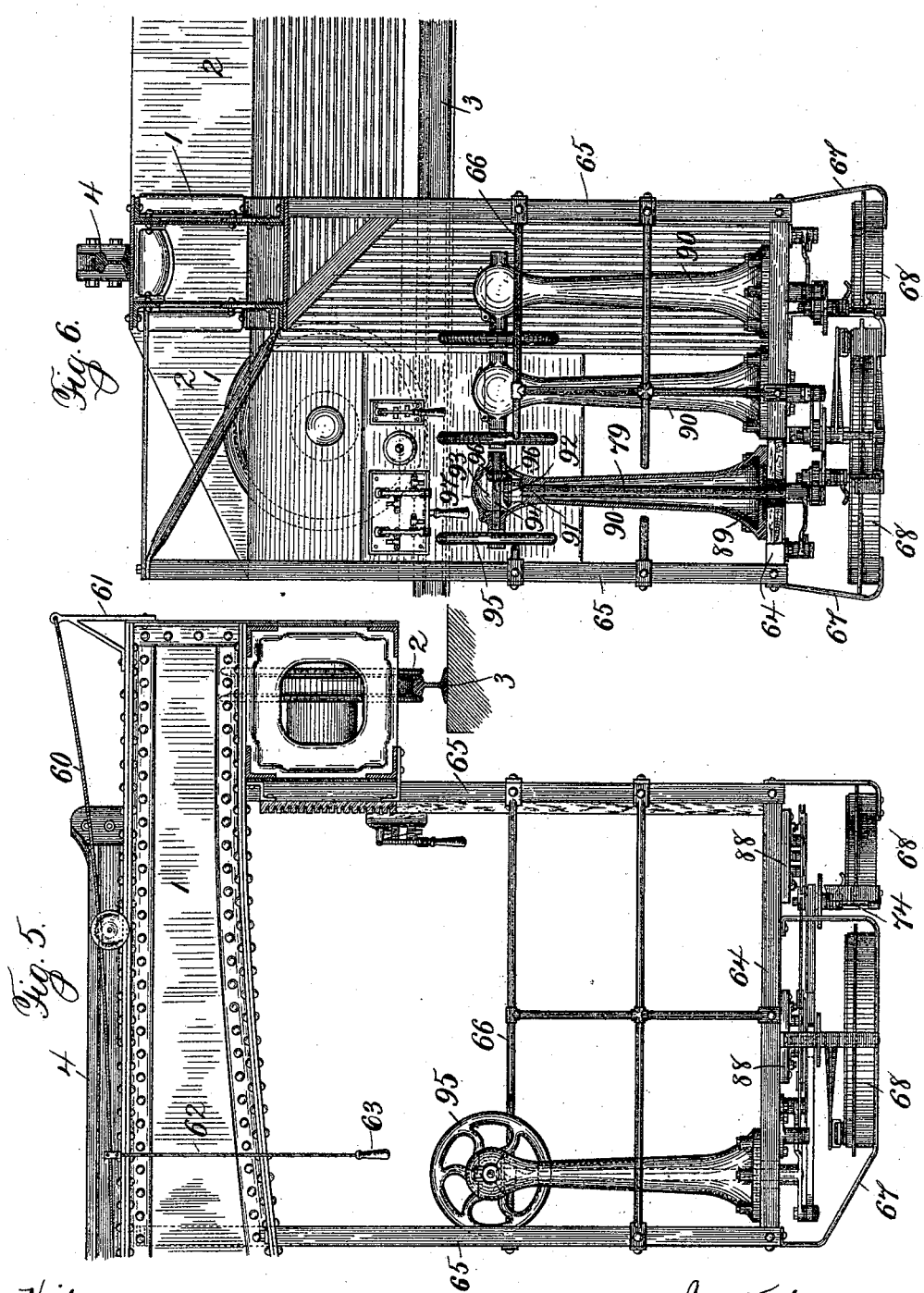

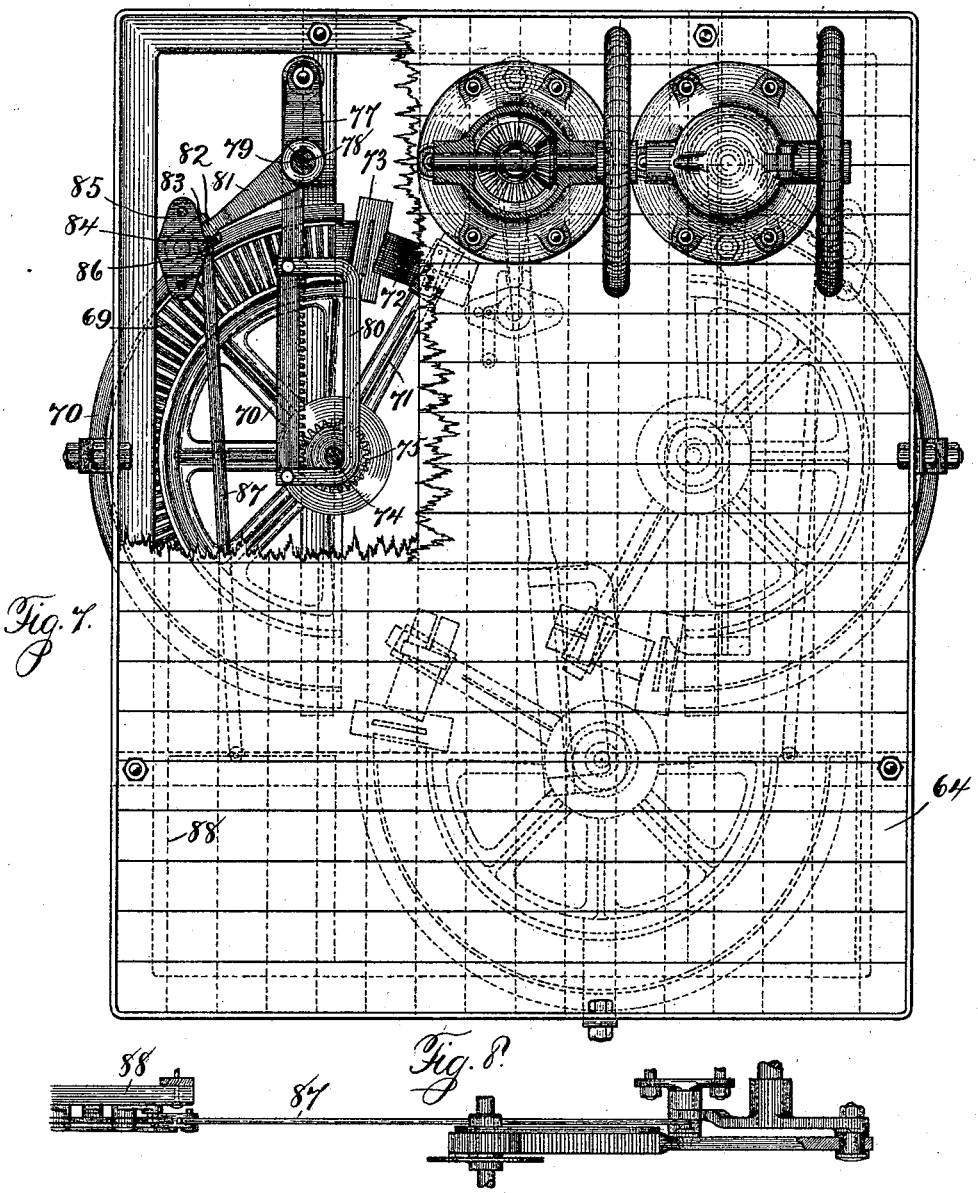

(No Model.)  8 Sheets—Sheet 6.
W. H. MORGAN.
ELECTRICALLY OPERATED OVERHEAD TRAVELING CRANE.
No. 496,427.  Patented May 2, 1893.

Witnesses
Jas. E. Hutchinson.
G. F. Downing.

Inventor
William H. Morgan
By H. A. Seymour
Attorney

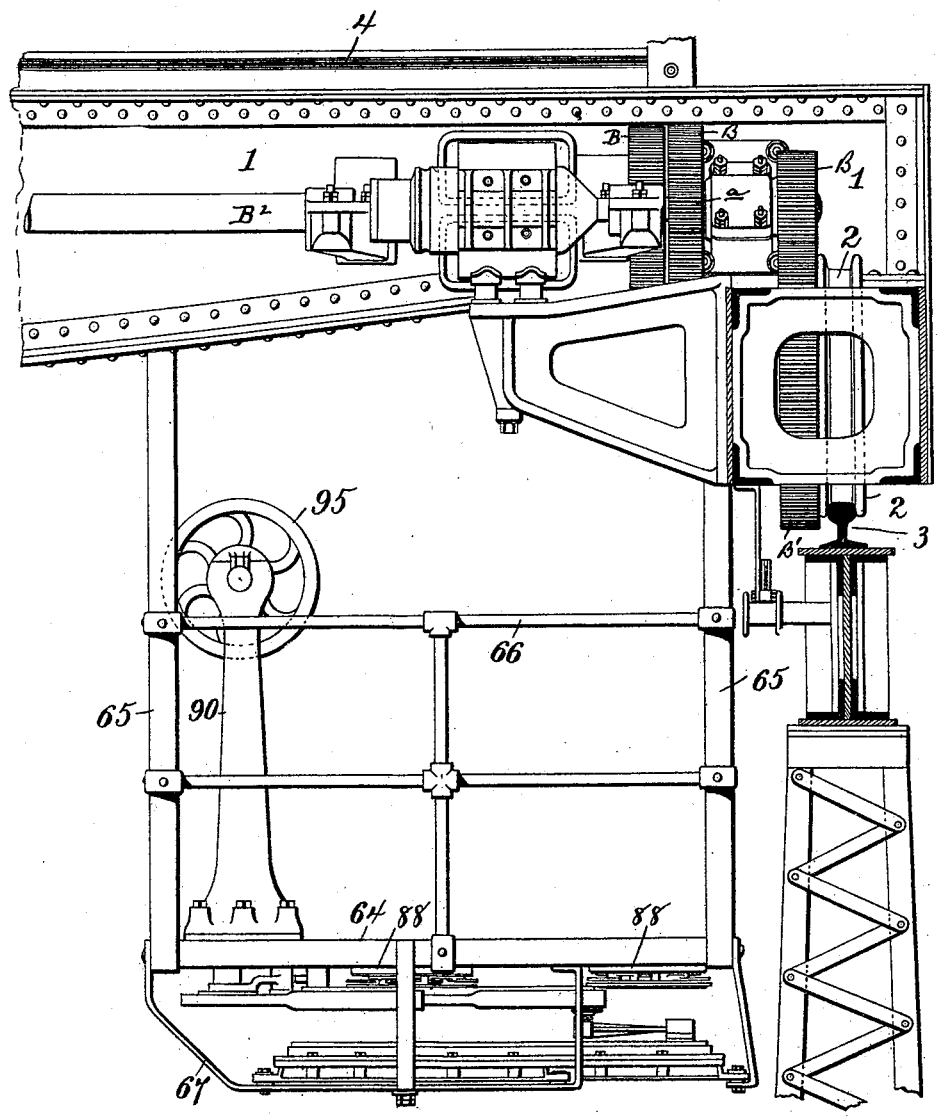

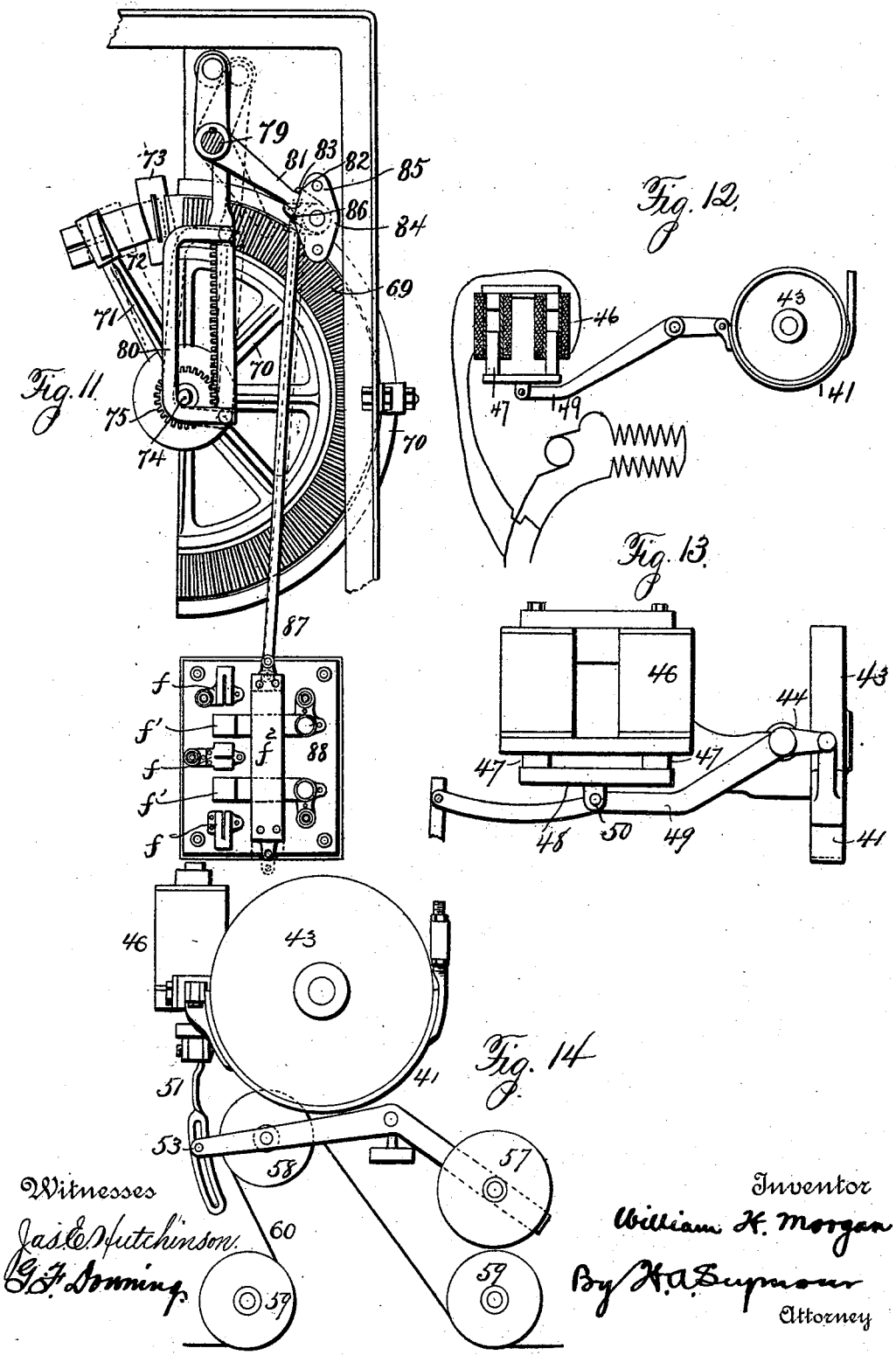

UNITED STATES PATENT OFFICE.

WILLIAM H. MORGAN, OF ALLIANCE, OHIO, ASSIGNOR OF THREE-FOURTHS TO THOMAS R. MORGAN, SR., THOMAS R. MORGAN, JR., AND JOHN R. MORGAN, OF SAME PLACE.

ELECTRICALLY-OPERATED OVERHEAD TRAVELING CRANE.

SPECIFICATION forming part of Letters Patent No. 496,427, dated May 2, 1893.

Application filed July 22, 1891. Serial No. 400,341. (No model.)

*To all whom it may concern:*

Be it known that I, WILLIAM H. MORGAN, of Alliance, in the county of Stark and State of Ohio, have invented certain new and useful Improvements in Electrically-Operated Overhead Traveling Cranes; and I do hereby declare the following to be a full, clear, and exact description of the invention, such as will enable others skilled in the art to which it appertains to make and use the same.

This invention relates to improvements in electrically operated over-head traveling cranes its object being to provide means whereby a single operator may have absolute control over the moving parts of the crane.

The invention consists essentially of an electrically controlled brake for the winding drum of the hoisting mechanism; and in current controlling mechanism whereby electric motors driving the several moving parts of the crane may be started, controlled, stopped and reversed. The improved braking mechanism consists of a gravity brake held out of operation when the motor driving the winding drum is in operation, by an electro-magnet included in the motor circuit and energized by the current flowing therethrough. The construction is such that when the motor circuit is broken, either by means of a suitable switch, or by accident, the magnet, becoming de-energized, immediately releases the brake so that the latter acting by gravity clutches and holds the hoisting mechanism against movement, and thereby prevents any load then sustained by the said hoisting mechanism from falling. The improved current controlling mechanism consists of a rheostat (one for each motor) and a reversing switch coupled to a common operating mechanism and so constructed that the switch may be moved in either direction to start the motor forward or backward, as the case may be, while the rheostat will always operate to include a greater or less amount of resistance in the motor circuit so that the current flowing through the same may be controlled in the usual manner.

In the accompanying drawings forming a part of this specification there is shown in detail an electrically operated over-head traveling crane with the improvements forming the subject matter of this application applied, but it will be understood that the present improvements are applicable with other constructions of cranes than the one herein shown, and that the invention may be otherwise embodied. For this reason I am not confined to the identical structure shown in the practical embodiment of my invention.

In the drawings:—Figure 1 is a plan view of the trolley of the crane with the improved electrical mechanical brake applied thereto. Fig. 2 is an end elevation of the trolley, and a sectional outline elevation of a traveling bridge on which the trolley is mounted. Fig. 3 is a side elevation of one end of the bridge with the trolley mounted thereon. Fig. 4 is an elevation of the side of the trolley opposite that shown in Fig. 3. Fig. 5 is an elevation of one end of the bridge showing the operator's platform or cage hung therefrom. Fig. 6 is a similar view partly in section taken at right angles to that shown in Fig. 5. Fig. 7 is a plan view partly in section and partly broken away, of the operator's platform. Fig. 8 is a detail view of a portion of a switch and rheostat operating mechanism. Fig. 9 is a view of a switch, and Fig. 10 is a view of one end of the bridge showing the bridge actuating motor. Fig. 11 is a view showing the rheostat, switch and operating mechanism. Fig. 12 is a diagrammatic view of the brake. Fig. 13 is a view in front elevation of the brake and Fig. 14 is a view in end elevation thereof showing more particularly the mechanical devices for drawing the armature away from the magnet.

Like letters and numerals of reference indicate like parts throughout the drawings.

The several parts of the crane, other than those forming the subject of the present invention, are fully described in other applications of Thomas R. Morgan, Sr., Thomas R. Morgan, Jr., John R. Morgan, and myself, and for this reason such parts are not herein described in detail further than is necessary for a clear understanding of their construction and operation in connection with those parts in which the invention is embodied.

The crane consists essentially of a bridge supported at the ends upon an elevated track along which it is driven, and a trolley carrying a winding drum and hoisting mechanism and mounted to travel along the bridge in the direction of the length thereof. The bridge, which is shown in Figs. 2, 3, 5 and 6 consists essentially of two trusses 1, 1, connected rigidly together at the ends where it is supported upon truck wheels 2, 2, resting on an elevated track, one of the rails 3, of which is shown in Figs. 3, 5 and 6. The bridge is driven along its supporting track by means of a suitable electric motor A having a small pinion $a$ on the armature shaft thereof for actuating the reducing gear B (see Fig. 10). The last pinion of the train B meshes with the pinion B' fast to wheel 2 or the axle thereof. The shaft $B^2$ on which the last pinion of the train B is mounted is located parallel with and extends to the opposite side of the bridge, and is provided at its other or opposite end with a pinion (not shown) engaging a pinion similar to the pinion B'. Upon track rails 4, extending along the top of the trusses 1 of the bridge there is mounted a trolley 5, shown in Figs. 1 to 4, and consisting of a carriage or truck supported upon two pairs of truck wheels 6, 7, one pair 6, rotating freely and the other pair 7, constituting the drivers of the trolley. There is a winding drum 8, provided with a shaft 9 journaled in the trolley frame near one end of the latter, and near the other end the trolley frame is provided with a heavy cross beam 10, to which is secured a fixed pulley block 11, forming one element of the hoisting gear. Below this block 11, there is another, and movable pulley block 12, forming the other element of the hoisting gear, and suspended by a suitable chain tackle connected to the winding drum and extending over pulleys in both the fixed and movable blocks in the usual manner; this chain tackle is indicated by the dotted lines 13, in Figs. 2 and 3, and the movable pulley block is provided with a hook 14, by means of which the load to be lifted and transported by the crane, is attached to the hoisting mechanism.

The idlers 6, forming one pair of the supporting wheels of the trolley, are mounted to rotate freely upon the shaft 9, and the drivers 7 are affixed to an axle 15 journaled in the trolley frame near one end as shown. The trolley is driven along the bridge by means of an electric motor 16 mounted on the trolley frame at one side of the winding drum and geared to the trolley driving wheels 7. This motor, as are all the motors of the trolley, is pivotally supported at one end in a suitable bearing, and at the other end upon a spring cushion 16' whereby sudden shocks to the motor in starting, or from other causes, are avoided. On the armature shaft of the motor 16 there is a pinion 17 meshing with a gear wheel 18 on a short counter-shaft 19, journaled in the trolley frame. This shaft 19, carries a pinion 20, meshing with a gear wheel 21, on one end of another counter shaft 22, on the other end of which is a gear wheel 23, which, through an idle gear 24, drives a gear 25, on a shaft 26, extending across, and journaled in the trolley frame above the axle 15. The shaft 26, carries two pinions 27, meshing with corresponding gears 28, on the axle adjacent to, or secured each to one of the driving wheels 7.

As will readily be understood, the motor 16 will drive the trolley along the bridge to any desired point thereon and any load sustained by the hoisting mechanism on said trolley will participate in such movement; and if the bridge be moved along its track the trolley and its load will be carried with it so that by means of the combined movements of the trolley and bridge, the load may be carried to any desired point and be there deposited.

The winding drum 8, is operated by an electric motor 29, mounted on the trolley frame at one side of the winding drum, and driving the latter by a train of gearing. On the armature shaft of this motor 29, there is a pinion 30, meshing with a gear 31, on a short counter-shaft 32 the other end of which carries a pinion 33, meshing with a gear 34, on the corresponding end of a counter-shaft 35, carrying a pinion 36 on its other end, which pinion meshes with a large gear 37 on one end of a shaft 38 journaled in, and extending across the trolley frame, and there carrying a pinion 39, meshing with a large gear wheel 40 at one end of the winding drum 8.

The brake for holding the winding drum against rotation when the winding drum motor is not in operation, is shown in Figs. 1, 2 and 3, and consists of a flexible strap 41, fastened at one end to a bracket 42 (Fig. 1) or other fixed structure on the trolley frame and passes under, and partially encircles the periphery of a brake wheel 43 fastened on one end of the armature shaft of the motor 29. The other end of the strap 41, is secured to a short arm 44 of a lever 45 pivoted to the motor frame. On the outer ends of the pole pieces of the motor 29, there is fastened an electric magnet consisting of two solenoids 46 yoked together and provided with movable cores 47, joined by a yoke or armature 48 which moves with the said cores. The lever 45 has its long arm 49 jointed to the center of the armature by means of a sliding pivotal connection 50. The solenoids are included in the circuit of the motor 29, so that when the motor is in operation, the whole or part of the current, passes through the solenoids and energizes them causing them to draw up the armature, thereby moving the lever 45 on its pivot, and as this movement will cause the short arm of the lever to move downward, the brake strap 41, will fall away from the brake wheel, and offer no resistance to the rotation of the latter. When the circuit through the motor 29, is broken, either purposely, or accidentally, the solenoids will be de-energized and allow the armature to drop away from them by its own weight, moving the lever 45, with it, thus lifting the short arm 44, of the lever and forcing the strap 41 into engagement with the brake wheel 43. The weight of the armature and solenoids together, with other parts connected with the lever 45, is sufficient to apply the brake strap to the brake wheel with a force great enough to securely hold the said brake wheel against rotation when the crane is sustaining any weight up to the limit of its capacity, so that there is no danger of the load being accidentally deposited, since the brake works automatically whenever the motor circuit is broken.

To bring the brake under the direct control of the operator, so that he may operate it should it fail from any cause to work automatically, the long arm 49, of the lever 45 is extended beyond its point of connection with the armature 48, and it carries at its extreme end a depending link 51 having at its lower end a curved slot 52, through which passes a pin 53, fixed in the bifurcated end of an arm 54, of a lever 55 pivoted on the trolley frame, the other arm 56, of the said lever being provided with a weight 57. Journaled in the bifurcated arm 54 of the lever 55 there is a grooved pulley 58, and below this pulley are two other similar pulleys 59, 59 journaled in the trolley frame, all of the said pulleys being in the same vertical plane.

Extending along the bridge there is a rope 60 secured at each end to a bracket 61 (one only being shown) at the ends of the bridge. This rope passes under one of the pulleys 59 upward over the pulley 58, and thence downward and under the other pulley 59, the tension of the rope being such that it will pass freely around the pulleys as the trolley travels along the bridge without affecting the weight of the lever 55. Attached to the rope 60, near one end there is a pendent rope 62 terminating in a handle 63 within reach of the operator.

If at any time the gravity brake should fail to operate when the circuit through the motor 29 is broken, the operator may seize the handle 63, and pulling down upon it tighten the rope 60, until the weight 57 is overcome and the bifurcated end of the lever 55 is depressed until the pin 53 engages the lower end of the slot 52 in the link 51. A further downward movement of the lever 55, will through the link 51 depress the long arm of the lever 45, and thus in the manner before described, apply the brake. When the operator releases the rope 62, the weight 57 will return the lever 55 and rope 60, to their normal positions.

Referring now more particularly to Figs. 5, 6, 7 and 8, I will proceed to describe my improved means for regulating and controlling the several motors driving the different parts of the crane. Hung from one end of the bridge is the operator's cage, consisting essentially of a platform 64 supported by hangers 65, secured at their lower ends to the platform and at their upper ends to the bridge. The cage is provided with guard rails 66, to prevent the operator from accidentally stepping from the platform. Secured to the under side of the platform by brackets 67, are rheostats 68, one for each motor on the crane, and each included in the respective motor circuit. Each rheostat consists essentially of a semi-circular series of resistance plates (or coils) 69, seated in the semi-circular groove or channel formed in a frame 70. Pivotally supported at a point central to the semi-circular series of resistance plates, there is an arm 71, carrying at its outer end a brush 72 constructed to sweep over the resistance plates as the arm is swung on its pivot, and make contact successively with the exposed edges of said plates, or with separate contact plates when the rheostat is formed of coils of wire or other resistance material. At one end of the rheostat is an idle contact plate 73, onto which the brush 72, which it will be understood, is included in the motor circuit is moved when it is desired to break the motor circuit at the rheostat. The construction of the rheostat is such that when the circuit is completed, by moving the brush 72 from the idle contact plate onto the first one of the series of resistance plates, the entire resistance is included in the circuit, and as the forward movement of the brush is continued, the resistance plates are successively cut out of circuit and the resistance correspondingly reduced until the brush arm has reached the other end of the semi-circular series of plates, at which point the resistance is entirely cut out of the circuit and the full current flows to the motor. The pivotal support of the arm 71 consists of an upright spindle 74, journaled in the frame 70 and carrying above the arm 71, a pinion 75 meshing with a rack bar 76, which serves to partially rotate the pinion 75, thereby causing the brush arm to sweep over the resistance plates in the manner described. The rack bar 76 is pivotally connected at one end to an arm 77 of a bell-crank lever 78 on the lower end of an upright shaft 79 extending upward through the platform 64. The other end of the rack bar is maintained in engagement with the pinion 75 by means of a guide frame 80 consisting essentially of a bar or rod having its ends bent at right angles to the main portion and there secured to the upper face of the rack bar so that the main portion of the guide frame is parallel with the toothed edge of the rack bar and sufficiently above the latter to rest on the upper face of the pinion 75 when the rack bar is in engagement therewith. The frame 80 is of such dimension that when the rack bar is in engagement with the pinion 75, the inner edge of the said frame will bear against the spindle 74 and being parallel to the toothed edge of the rack bar will maintain the latter always in contact with the pinion while the other end of the rack bar is moved through an arc shaped path by the bell-crank lever 78. It will be observed that as shown in the drawings, the rack bar is at the limit of its movement in one direction and that whether the shaft 79 be turned in one direction altogether, the rack bar will be moved to rotate the pinion 75 in one direction only, that is, in a direction which will carry the brush arm over the resistance plates. The bell crank lever 78 is provided with an arm 81 terminating in a knuckle 82, in the path of which is a socket arm 83, projecting from an upright hub 84 pivotally mounted in a bracket 85 depending from the under side of the platform 64. The hub 84, has a stud 86 projecting from it to which stud is pivoted a link 87, connected to the movable member of a reversing switch 88. The position of the switch is shown in dotted lines in Fig. 7 and its construction is clearly disclosed in Fig. 9. This switch is provided with three stationary contacts $f$ and two movable contacts $f'$, the latter being coupled by bar $f^2$ one end of which is connected to link 87. When the parts are in position, shown in Fig. 7, the rheostat switch arm is at the limit of its movement in one direction with the brush 72 on the idle contact 73, while the knuckle arm 81 of the bell crank lever is in engagement with the socket arm 83 and the latter is in such a position that the movable member of the switch 88 is midway between the contacts of said switch so that the circuit is broken. If now the shaft 79 be turned in one direction altogether, the knuckle arm 81 will move the hub 84 on its pivot until the movable members $f'$ of the switch 88 make contact with the contact plates of said switch to either drive the motor ahead or to reverse the same, as the case may be, and the knuckle arm then escapes from the socket in the arm 83. The movement of the switch operating mechanism is so timed that when the circuit has been completed at the reversing switch, the rack bar has turned the pinion 75 sufficiently to bring the brush 72 into contact with the first of a series of resistance plates, thus establishing the motor circuit and including the maximum resistance. The brush may then be moved successively over the resistance plates until as many as necessary are cut out in order that the desired amount of current may be delivered to the motor. When it is desired to stop the motor or to reverse it, the shaft 79 is rotated in the opposite direction, thus successively cutting in the resistance until the brush 72 reaches the idle contact 73, and the knuckle arm 81 engages the socket arm 83 and moves the reversing strip sufficiently to break the circuit. Continuing the movement of the shaft 79, the circuit will be again completed but the current will flow to the motor in reverse direction, and the resistance will be cut out in the manner before described.

The shaft 79 extends upward to the platform 64 through a bushing 89 therein and through a hollow post 90, securely bolted on the platform in the upper end of which post there is formed a journal bearing 91 for the shaft and the latter is provided at its upper end with a bevel gear 92 which seated on the bearing 91 serves to uphold the shaft 79. The upper end of the post 90 is expanded to form a chamber 93 and on diametrically-opposite sides of which are formed bearings for a horizontal shaft 94 carrying a manipulating hand wheel 95 outside of the said post, and the bevel pinion 96 within the chamber 93 and meshing with the gear wheel 92. Access to the chamber 93 may be had through a hinged cap or cover 97 applied to the top of the post 90. It will be observed that there are three rheostats and reversing switches with their operating mechanism shown in the drawings and all are located in the operator's case so that he may readily manipulate them. One of the rheostats and corresponding reversing switch is for the motor driving the hoisting mechanism, another is for the motor driving the trolley, and the third is for the motor driving the bridge.

It will thus be seen that an operator may, with great ease and comfort, control every part and movement of the crane so that the latter may be made to lift, transport and deposit any object, the weight of which is within the capacity of the crane, with certainty and dispatch.

I do not claim broadly herein the means connecting the rheostat and switch, and the devices for operating these parts simultaneously, as the same form the subject matter of divisional application, Serial No. 446,594, filed September 22, 1892. Neither do I claim in this application the gravity brake *per se*, as the same forms the subject of a pending application, Serial No. 413,049, filed November 25, 1891.

Having fully described my invention, what I claim as new, and desire to secure by Letters Patent, is—

1. In a hoisting crane the combination with hoisting mechanism, and an electric motor for driving the same, of a gravity brake acting on the armature shaft of the motor, the said brake consisting essentially of a friction device and a pivoted lever connected thereto at one end and weighted at its opposite end, and an electro magnet in the motor circuit acting on the brake to hold it out of operation when the motor circuit is closed, substantially as set forth.

2. In a hoisting crane, the combination with hoisting mechanism an electric motor for driving the same, of a gravity brake for the hoisting mechanism, an electro-magnet in the motor circuit for holding the brake out of operation when the motor circuit is closed, and a mechanical connection to the brake adapted to act in conjunction with the force of gravity, to apply the brake, substantially as described.

3. In an overhead traveling crane the combination with a hoisting mechanism a trolley carrying the same, a traveling bridge carrying the trolley and electric motors, one each for the hoisting mechanism, trolley and bridge, of a gravity brake for the hoisting mechanism the said gravity brake consisting essentially of a brake band, and a pivoted lever connected thereto at one end and weighted at its opposite end, and an electro-magnet in the motor circuit holding the brake out of operation when the drum motor circuit is closed, substantially as described.

4. In an overhead traveling crane, the combination with a hoisting mechanism, a trolley carrying the same, a traveling bridge carrying the trolley, and electric motors, one each for the hoisting mechanism, trolley and bridge, of a rheostat and reversing switch for each motor, and an operating mechanism common to both the rheostat and reversing switch the said operating mechanism adapted to actuate the switch arm before the rheostat is moved sufficiently to cut out any of the resistance plates or coils, substantially as described.

5. The combination with an electric motor, of a gravity brake an electro-magnet in the motor circuit acting on the brake to hold it out of operation when the motor circuit is closed and means for actuating said brake mechanically, substantially as set forth.

6. In a hoisting apparatus the combination with a drum and a motor for actuating the same of a rheostat and a reversing switch for said motor, the said rheostat and switch being actuated by a single shaft, the parts being arranged whereby the switch is actuated before the brush or movable contact of the rheostat passes and cuts out any of the resistance coils of the rheostat, substantially as set forth.

7. The combination with a motor and a brake mechanism actuated by gravity and consisting of a pivoted lever connected at one end to a shoe, and provided with an armature at its opposite end, of a magnet located in the motor circuit and in a position above said weight or armature, and adapted to elevate same and release the brake when the motor circuit is closed, and a mechanical device for removing the armature from the magnet in the event the former should stick, substantially as set forth.

8. The combination with a motor, a braking mechanism actuated to apply the brake by gravity and consisting of a pivoted lever connected at one end to a brake and provided at its other end with an armature, of a magnet located in the motor circuit and in a position to elevate the armature on the lever and thus release the brake and a mechanical device for separating the weight from the magnet and for assisting the weight in applying the brake, substantially as set forth.

In testimony whereof I have signed this specification in the presence of two subscribing witnesses.

WILLIAM H. MORGAN.

Witnesses:
H. W. HARRIS,
FRANK. E. DUSSEL.